(12) United States Patent
Kamerman et al.

(10) Patent No.: US 7,366,144 B2
(45) Date of Patent: Apr. 29, 2008

(54) METHOD OF DYNAMICALLY SETTING AT LEAST ONE THRESHOLD AT AN ACCESS POINT IN A WIRELESS LOCAL AREA NETWORK AND THE ACCESS POINT

(75) Inventors: Adriaan Kamerman, Nieuwegein (NL); Leo Monteban, Nieuwegein (NL)

(73) Assignee: Agere Systems Inc., Allentown, PA (US)

( * ) Notice: Subject to any disclaimer, the term of this patent is extended or adjusted under 35 U.S.C. 154(b) by 988 days.

(21) Appl. No.: 10/103,866

(22) Filed: Mar. 25, 2002

(65) Prior Publication Data

US 2003/0179708 A1 Sep. 25, 2003

(51) Int. Cl.
*H04Q 7/24* (2006.01)
(52) U.S. Cl. ...................................... 370/338
(58) Field of Classification Search ..................... None
See application file for complete search history.

(56) References Cited

U.S. PATENT DOCUMENTS

| | | | |
|---|---|---|---|
| 5,987,033 A | 11/1999 | Boer et al. | |
| 6,067,291 A | 5/2000 | Kamerman et al. | |
| 6,157,616 A * | 12/2000 | Whitehead | 370/252 |
| 6,580,700 B1 * | 6/2003 | Pinard et al. | 370/332 |
| 6,922,405 B2 * | 7/2005 | Eikelenboom et al. | 370/338 |
| 2005/0054294 A1 * | 3/2005 | Khun-Jush et al. | 455/63.1 |

FOREIGN PATENT DOCUMENTS

| | | |
|---|---|---|
| EP | 0 474 489 A2 | 3/1992 |
| EP | 0 903 891 A1 | 3/1999 |
| EP | 1 107 628 A2 | 6/2001 |
| EP | 1 139 606 A1 | 10/2001 |

OTHER PUBLICATIONS

U.S. Appl. No. 09/817,474, filed Mar. 26, 2001.
U.S. Appl. No. 09/859,334, filed May 12, 2001.
U.S. Appl. No. 10/140,689, filed May 8, 2002.
European Search Report, App. No. EP 03 25 1816, Aug. 31, 2004.
Sheu, Shiann-Tsong and Wu, Chih-Chiang, "Dynamic Access Point Approach (DAPA) for IEEE 802.11 Wireless LANs", IEEE 1999, pp. 2646-2650.

* cited by examiner

*Primary Examiner*—Anh-Vu Ly
(74) *Attorney, Agent, or Firm*—Mendelsohn & Associates; Steve Mendelsohn

(57) ABSTRACT

In the method of dynamically setting at least one threshold at an access point in a wireless local area network, signals from other access points are sensed, and a carrier detect threshold is determined based on the received signal strength of at least one of the sensed signals.

28 Claims, 3 Drawing Sheets

|  | HIGH DENSITY | MEDIUM DENSITY | LOW DENSITY |
|---|---|---|---|
|  |  |  |  |
| CarrierDetectThreshold | -85 dBm | -90 dBm | -95 dBm |
| DeferThreshold | -75 dBm | -85 dBm | -95 dBm |
| CellSearchThreshold | 30 dBm | 23 dBm | 10 dBm |
| OutofRangeThreshold | 12 dBm | 7 dBm | 2 dBm |
|  |  |  |  |

METHOD OF DYNAMICALLY SETTING AT LEAST ONE THRESHOLD AT AN ACCESS POINT IN A WIRELESS LOCAL AREA NETWORK AND THE ACCESS POINT

BACKGROUND OF THE INVENTION

1. Field of the Invention

This invention relates to wireless data communication systems and specifically to setting thresholds of an enhanced medium access control function.

2. Description of Related Art

With a view to obviate the need for wired cabling connections between stations in local area networks (LANs), wireless local area networks have been developed, and are now commercially available. These wireless local area networks employ a plurality of mobile network stations, which may be data processing devices (such as personal computers) having wireless communication capability.

A wireless local area network includes an access point, which serves as a base station, and a plurality of other network stations. The network stations within a group or a cell communicate directly to their corresponding access point. This access point forwards messages to the destination station within the same cell or through a wired distribution system to a wired destination station (e.g., server, printer, etc.) or to another access point, from which such messages arrive finally at a wireless destination station.

Wireless LANs present several challenges not encountered by wired based LANs. For example, the size of the cell served by an access point must be established and the potential mobility of network stations has to be taken into account. Also, for wireless based networks, which use a single channel, it is substantially more difficult to detect collisions due to the large dynamic range of receive signal levels. Therefore, wireless local area networks typically employ a collision avoidance scheme, instead of collision detection.

These issues are dealt with by setting certain communication parameters. One parameter is referred to as the carrier detect threshold for receiving a desired signal. The carrier detect threshold is the level of the observed carrier signal, below which a network station or access point will not attempt to process data signals. For example, by varying the carrier detect threshold, it is possible to select the signal level above which signals are received and processed. A second parameter is referred to as the defer threshold. The defer threshold is the level of the observed carrier signal, above which a network station will defer the transmission of data signals.

Wireless local area networks, LANs, are generally configured based on a medium access control (MAC) arrangement that employs a listen-before-talk scheme like CSMA/CA (carrier sense multiple access with collision avoidance) as described by the IEEE 802.11 standard.

In accordance with the medium access control (MAC) arrangement, each local area network station begins transmission when it determines that no other station is transmitting communication signals. To this end, each station defers its transmission of signals, so long as the signal level it receives from other stations is above the defer threshold. Thus, the medium access control (MAC) arrangement prevents a second station remotely located from the first station, to start signal transmission that overlaps in time with an earlier started transmission by the first station typically, the second station defers its signal transmission for a randomly selected period of time.

A third parameter includes a collection of thresholds referred to as roaming thresholds. A first roaming threshold called a cell search threshold sets the receive signal strength or signal-to-noise ratio (SNR) below which a network station will scan for other access points and determine, based on the results of the scan, whether the network station should communicate via a different access point. A second roaming threshold called an out-of-range threshold sets the receive signal strength or SNR below which the network station concludes the access point serving the network station is out of range. In this instance, the network station will perform a more robust scan for new access points with which to communicate.

When establishing or modifying a wireless LAN a network administrator sets or adjusts the above-described parameters. This process is time consuming, and relies on the administrator to optimize the system.

SUMMARY OF THE INVENTION

In the method according to the present invention, an access point establishes the communication parameters such as the carrier detect threshold, defer threshold and the roaming thresholds without administrator involvement. The access point senses the strength of signals received from other access points in the wireless LAN, and using a predefined metric, establishes the carrier detect threshold based on at least one of the sensed signal strengths. The defer threshold and the roaming thresholds are then established based on the carrier detect threshold. Having established these communication parameters, the access point broadcasts the communication parameters to the network stations using the access point as their serving access point.

In this manner, the access point self configures and assists in optimizing the wireless LAN without administrator intervention. This greatly simplifies initially setting up a wireless LAN or changing the wireless LAN (e.g., the addition or deletion of access points). In self-establishing the carrier detect threshold, the access point is self-determining the density of the wireless LAN and establishing communication parameters in accordance with the determined density.

BRIEF DESCRIPTION OF THE DRAWINGS

The present invention will become more fully understood from the detailed description given herein below and the accompanying drawings which are given by way of illustration only, wherein like reference numerals designate corresponding parts in the various drawings, and wherein.

DETAILED DESCRIPTION OF EMBODIMENTS

Figures 1, 5:
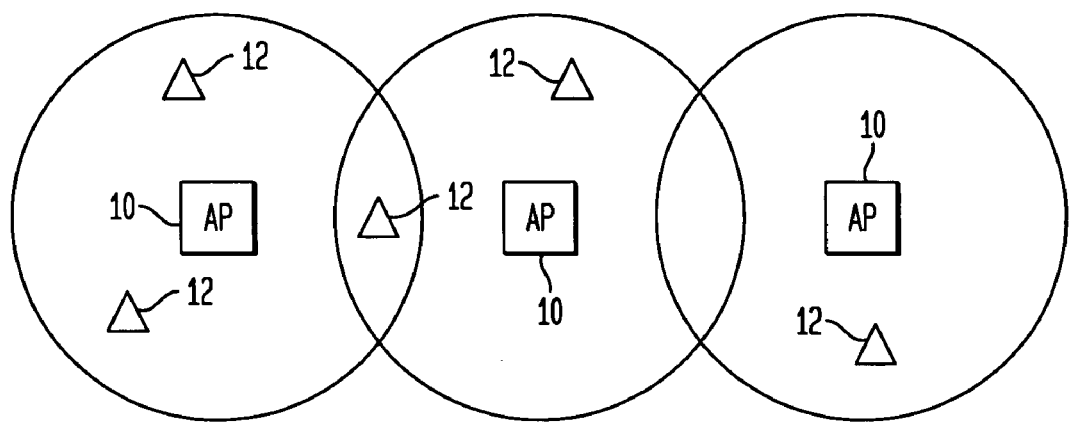
FIG. 1 illustrates a wireless LAN network according to an embodiment of the present invention.
FIG. 5 illustrates lookup table entries according to an embodiment of the present invention.

FIG. 1 illustrates a wireless LAN network according to the present invention. As shown, the wireless LAN network includes a plurality of access points 10, which serve as a base stations as described above. However, the invention is not limited in that respect and other types of local area networks that employ a server station for forwarding messages back and forth to network stations may be employed. The access points 10 may be connected to other devices and/or networks with which network stations 12 in the LAN may communicate. The access point 10 includes an antenna configured to transmit and receive data signals over a communications channel. As alluded to above, the access points 10 communicate with the network stations 12 (e.g., portable computers, printers, etc.). Generally an access point 10 communicates with the network stations 12 that fall within the cell or coverage area of the access point 10. Like the access points 10, the network stations 12 each have an antenna for communication. The network stations 12 are capable of transmitting and receiving messages selectively at a data rate of, for example, 1 Mbit/s (Megabit per second) or 2 Mbit/s, using direct sequence spread spectrum (DSSS) modulation as specified in the IEEE 802.11 standard, although the invention is not limited in scope in that respect.

Figure 2:
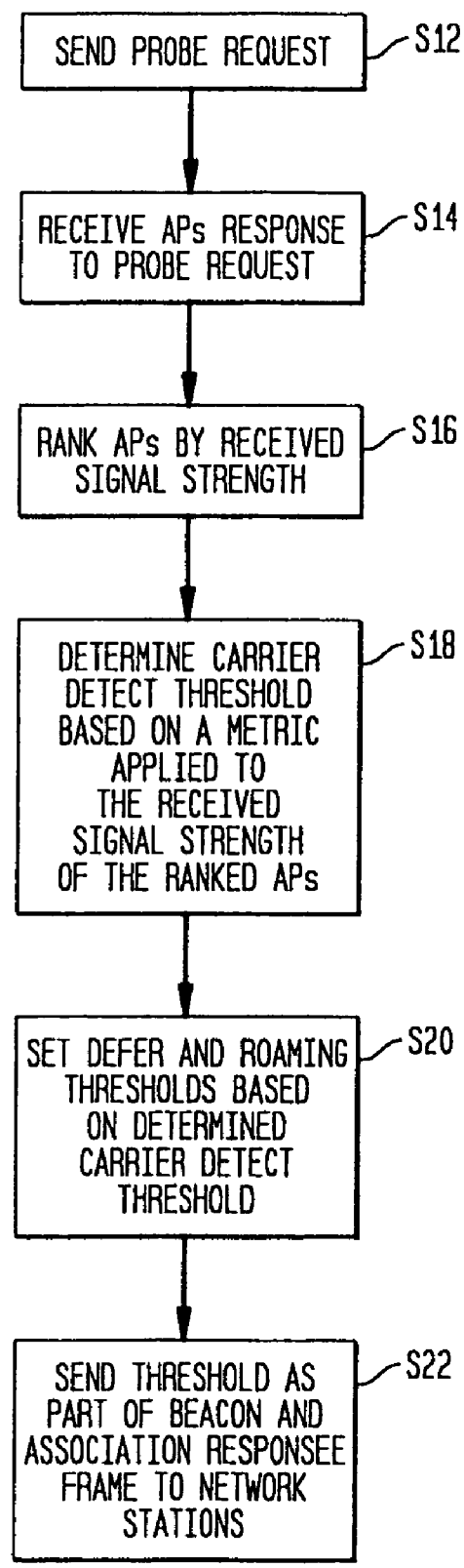
FIG. 2 illustrates a flow chart showing one embodiment of the process employed by an access point in the wireless LAN to establish communication thresholds.

When a new access point 10 is added to the wireless LAN network, the new access point 10 determines without administrator involvement the carrier detect, defer and roaming thresholds that principally establish the coverage area of the access point 10. FIG. 2 illustrates a flow chart of the process performed by the access point 10 in self determining these thresholds.

As shown in FIG. 2, after an access point 10 start up, or periodically after start up, the access point 10 in step S12 issues a probe request. The access point 10 issues the probe request at the lowest data rate to allow information exchange in the most robust mode and to cover the largest distance. This requesting access point 10 also temporarily uses the lowest defer threshold to avoid collision as much as possible. Besides requesting an acknowledgement response, the probe request can also request information such as load factors and thresholds used by access points 10 receiving and processing the probe request.

The access points 10 receiving and the processing the probe request send probe request responses to the access point 10 issuing the probe request. Namely, access points 10 receiving the probe request above their carrier detect thresholds send responses to the requesting access point 10. A probe request response acknowledges receipt of the probe request, and supplies any information requested in the probe request.

In step S14, the requesting access point 10 receives the probe request responses. In step S16, the requesting access point 10 ranks the responding access points 10 by the signal strength of the received probe request responses. To receive the maximum number of probe request responses and to receive responses from access points 10 farthest from the requesting access point 10, the access points 10 (having good capture-in-receive-level capabilities) operate with a carrier detect threshold as low as possible in contrast to the network stations 12.

After ranking the responding access points 10 by received signal strength, the requesting access point 10 determines the carrier detect threshold based on a metric applied to the ranked access points 10 in step S18. In a first embodiment, the received metric is selecting the received signal strength of the responding access point 10 having the third highest received signal strength of the responding access points 10 as the carrier detect threshold. In a second embodiment, the received metric is selecting the received signal strength of the responding access point 10 having the fourth highest received signal strength as the carrier detect threshold. In a third embodiment, the average of the eight highest received signal strengths is set as the carrier detect threshold. In a modification of the third embodiment, hence a fourth embodiment, the number of access points 10 involved in the averaging operation varies depending on the number of responding access points 10. In a modification of the third or fourth embodiment, hence fifth and sixth embodiments, a weighted average is obtained. As will be further appreciated, instead of storing the probe request responses for all responding access points 10, a predetermined number of probe request responses having the highest received signal strengths are stored by the requesting access point 10.

As will be appreciated, the embodiments discussed above are only a few examples of the many different metrics that can be applied in setting the carrier detect threshold. Any such metric is intended to fall within the spirit and scope of the present invention.

Having set the carrier detect threshold, the defer and roaming thresholds are established in step S20. In a first embodiment, the defer threshold is set to a predetermined offset (e.g., 10 dB) from the established carrier detect threshold. In a second embodiment, the requesting access point 10 stores a look up table of associated carrier detect thresholds and defer thresholds. In this embodiment, the requesting access point 10 looks up the defer threshold from the table using the established carrier detect threshold. It will be further appreciated, that the defer threshold could be determined according to an equation where the established carrier detect threshold is at least one of the inputs.

Similar to the embodiments discussed above are the embodiments for determining the roaming thresholds. For example, in one embodiment, one or both of the cell search and out-of-range thresholds are respective predetermined offsets from the established carrier detect threshold. In one embodiment, the SNR based cell search threshold (CST, expressed in dB) is set equal to the maximum of (i) the carrier detect threshold (CDT, expressed in dBm) plus 115, and (ii) 40. Expressed as a formula $CST_{dB}=\max(CDT_{dBm}+115, 40)$. The SNR based out-of-range threshold (OoRT, expressed in dB) is made equal to the maximum of (i) the carrier detect threshold (CDT, expressed in dBm) plus 95, and (ii) 2. Expressed as a formula $OoRT_{dB}=\max(CDT_{dBm}+95, 2)$.

In another embodiment, the requesting access point 10 stores a table of associated carrier detect thresholds and one or both of the cell search and out-of-range thresholds. In this embodiment, the requesting access point 10 looks up at least one of the roaming thresholds from the table using the established carrier detect threshold. It will be further appreciated, that one or more of the roaming thresholds could be determined according to an equation where the established carrier detect threshold is at least one of the inputs.

For the respective embodiments where the defer threshold and the roaming thresholds are determined by table look up, FIG. 5 illustrates three exemplary table entries. Specifically, a high density, low density and medium density entry are shown in the table of FIG. 5, wherein density refers to the distance between access points 10 and hence the cell size of the access points 10.

Once the defer and roaming thresholds have been established in step S20, the requesting access point 10 broadcasts the established thresholds to the network stations 12 in step S22 by means of beacons and association response frames. Those network stations 12 adopting the requesting access point 10 as their serving access point 10 will use the thresholds established by the requesting access point 10.

Figure 3:
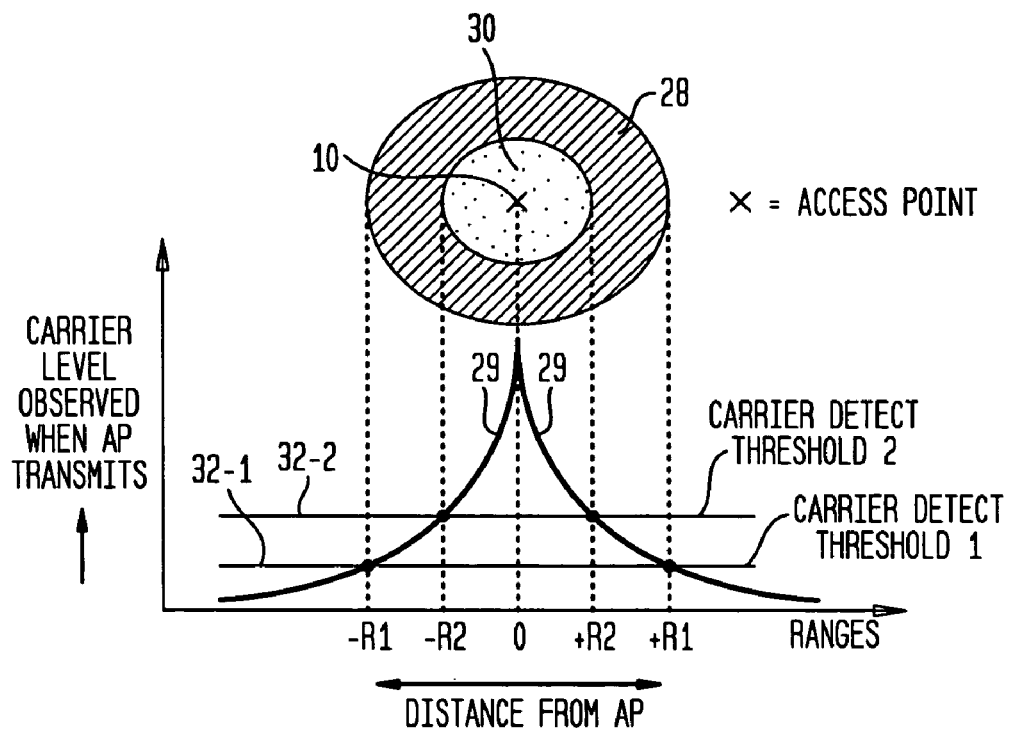
FIG. 3 illustrates the relationship between cell size and carrier detect threshold.

As explained above, the process of FIG. 2 is periodically repeated by the access points 10 to adaptively and automatically reconfigure the system without administrator involvement. The metric employed by the access point 10 in step S18 gauges the density of the LAN network, and establishes the cell size of the requesting access point 10 in accordance with the perceived density. In FIG. 3, the carrier signal level observed by network stations 12 remotely located from the requesting access point 10 is illustrated by curve 29 as a function of the distance of a network station 12 from the requesting access point 10. The curve 29 is determined by the transmit power used at the access point 10 and the path-loss characteristics of the environment. The receiver capability of a network station 12 within the cell is determined by the carrier detect threshold levels set by the requesting access point 10 in step S22, such as carrier detect thresholds illustrated by lines 32-1 or 32-2. As previously mentioned, the carrier detect threshold is defined as the carrier signal level, below which the network stations 12 will not process the incoming data signals. As illustrated, the carrier detect threshold 32-2, intersects with curve 29 at the distances −R2 and +R2, and the carrier detect threshold 32-1 intersects with curve 29 at the distances −R and +R. The distances at which the carrier detect threshold line crosses the carrier signal level curve determines the boundaries of the local area network cell, within which the network stations 12 may communicate with the requesting access point 10.

As is evident, with the lower more sensitive carrier detect threshold 32-1, operation and reception over a wider range is accomplished. The resulting cell by employing carrier detect threshold level 32-1 is illustrated as cell 28. Similarly, the resulting cell by employing carrier detect threshold 32-2 is illustrated as cell 30. It is noted that network stations 12 operating with a carrier detect threshold level 32-2 are less sensitive than network stations operating with a carrier detect threshold level 32-1.

Figure 4:
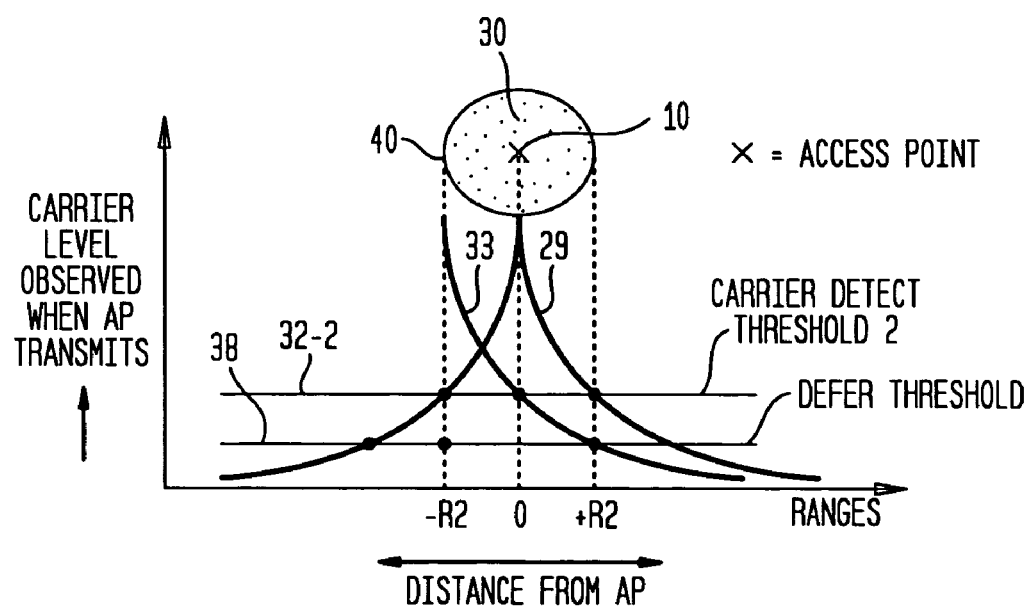
FIG. 4 illustrates the relationship between the carrier detect threshold and the defer threshold.

FIG. 4 shows one embodiment of the relation between the defer threshold illustrated as line 38 and the carrier detect threshold illustrated as line 32-2. FIG. 4 illustrates the situation where the defer threshold is set at a level below—more sensitive than—the carrier detect threshold, although the invention is not limited in scope in that respect. For example, in accordance with other embodiments of the invention, the carrier detect threshold and the defer threshold may be varied such that they attain substantially the same level, or the carrier detect threshold is lower than the defer threshold.

The invention being thus described, it will be obvious that the same may be varied in many ways. Such variations are not to be regarded as a departure from the spirit and scope of the invention, and all such modifications are intended to be included within the scope of the following claims.

The invention claimed is:

1. A method of dynamically setting at least one threshold at an access point in a wireless local area network, comprising:

sensing signals from other access points;

determining a carrier detect threshold based on received signal strength of at least one of the sensed signals, wherein the carrier detect threshold is a level of an observed carrier signal, below which a network station in the wireless local area network or the access point will not attempt to process received data signals;

determining received signal strength of a received data signal;

comparing the received signal strength of the received data signal to the carrier detect threshold to determine whether to continue to attempt to recover data from the received data signal;

continuing the attempt to recover the data from the received data signal if the received signal strength of the received data signal is greater than the carrier detect threshold; and discontinuing the attempt to recover the data from the received data signal if the received signal strength of the received data signal is less than the carrier detect threshold.

2. The method of claim 1, further comprising: sending a probe signal; and wherein the sensing step senses responses from other access points to the probe signal.

3. The method of claim 1, wherein the determining step comprises: ranking the sensed signals by received signal strength; selecting a sensed signal having a predetermined position in the ranking; and determining the carrier detect threshold as the received signal strength of the selected sensed signal.

4. The method of claim 3, wherein the selecting step selects the sensed signal having one of the third and fourth highest signal strength.

5. The method of claim 1, wherein the determining step comprises: ranking the sensed signals by received signal strength; determining the carrier detect threshold as a weighted average of the received signal strengths of a predetermined number of the sensed signals having highest received signal strengths.

6. The method of claim 1, wherein the determining step comprises: ranking the sensed signals by received signal strength; determining the carrier detect threshold as one of a mean and median of the received signal strengths of a predetermined number of the sensed signals having highest received signal strengths.

7. The method of claim 1, further comprising: setting a defer threshold based on the determined carrier detect threshold, wherein the defer threshold is different from the determined carrier detect threshold.

8. The method of claim 7, wherein the setting step sets the defer threshold equal to a predetermined offset from the determined carrier detect threshold.

9. The method of claim 7, wherein the setting step reads the defer threshold from a look-up table based on the determined carrier detect threshold.

10. The method of claim 7, wherein:

the defer threshold is the level of the observed carrier signal, above which the network station will defer the transmission of data signals.

11. The method of claim 1, further comprising: setting at least one roaming threshold based on the determined carrier detect threshold.

12. The method of claim 11, wherein the setting step sets at least one of the roaming thresholds according to an equation where the determined carrier detect threshold is an input to the equation.

13. The method of claim 11, wherein the setting step reads at least one of the roaming thresholds from a look-up table based on the determined carrier detect threshold.

14. The method of claim 11, wherein the roaming thresholds include a cell search threshold and an out-of-range threshold, wherein:

the cell search threshold sets a signal strength value below which a network station will scan for other access points; and the out-of-range threshold sets a signal strength value below which a network station concludes that the access point serving the network station is out of range.

15. The method of claim 1, further comprising:
setting a defer threshold based on the determined carrier detect threshold, wherein the defer threshold is different from the determined carrier detect threshold; and
setting at least one roaming threshold based on the determined carrier detect threshold.

16. The method of claim 15, further comprising: outputting the determined carrier detect threshold, the set defer threshold, and the set roaming threshold for receipt by stations.

17. The method of claim 14, wherein the at least one roaming threshold includes a cell search threshold and an out-of-range threshold, wherein:
the cell search threshold sets a signal strength value below which a network station will scan for other access points; and
the out-of-range threshold sets a signal strength value below which a network station concludes that the access point serving the network station is out of range.

18. The method of claim 1, further comprising: outputting the determined carrier detect threshold for receipt by stations.

19. The method of claim 1, wherein the carrier detect threshold is determined by:
ranking the other access points based on the received signal strengths of the sensed signals; and
selecting the carrier detect threshold based on the ranking.

20. The method of claim 19, wherein the carrier detect threshold is selected based on a received signal strength at a predetermined position in the ranking.

21. The method of claim 19, wherein the carrier detect threshold is selected based on a weighted average of at least some of the received signal strengths in the ranking.

22. The method of claim 19, wherein the carrier detect threshold is selected based on one of a mean and median of at least some of the received signal strengths in the ranking.

23. A method of dynamically setting at least one threshold at an access point in a wireless local area network, comprising: sending a probe signal; sensing responses from other access points to the probe signal; ranking the sensed signals by received signal strength; selecting a sensed signal having one of the third and fourth highest signal strength; determining a carrier detect threshold as the received signal strength of the selected sensed signal; setting a defer threshold based on the determined carrier detect threshold; and setting at least one roaming threshold based on the determined carrier detect threshold.

24. A wireless local area network, comprising: an access point, the access point sending a probe signal, sensing responses from other access points to the probe signal, ranking the sensed signals by received signal strength, selecting a sensed signal having one of the third and fourth highest signal strength, determining a carrier detect threshold as the received signal strength of the selected sensed signal, setting a defer threshold based on the determined carrier detect threshold, and setting at least one roaming threshold based on the determined carrier detect threshold.

25. A method of dynamically setting at least one threshold at an access point in a wireless local area network, the method comprising:
sensing signals from other access points;
ranking the other access points based on received signal strengths of the sensed signals; and
selecting a carrier detect threshold based on a weighted average of at least some of the received signal strengths in the ranking.

26. The method of claim 25, wherein the carrier detect threshold is selected as the weighted average of the received signal strengths of a predetermined number of the sensed signals having highest received signal strengths.

27. A method of dynamically setting at least one threshold at an access point in a wireless local area network, the method comprising:
sensing signals from other access points;
ranking the other access points based on received signal strengths of the sensed signals; and
selecting a carrier detect threshold based on one of a mean and median of at least some of the received signal strengths in the ranking.

28. The method of claim 27, wherein the carrier detect threshold is selected as one of the mean and median of the received signal strengths of a predetermined number of the sensed signals having highest received signal strengths.

* * * * *